May 12, 1970  W. SESHOLTZ  3,511,376
AQUARIUM FILTER AND HEATER
Filed Oct. 28, 1968  2 Sheets-Sheet 1
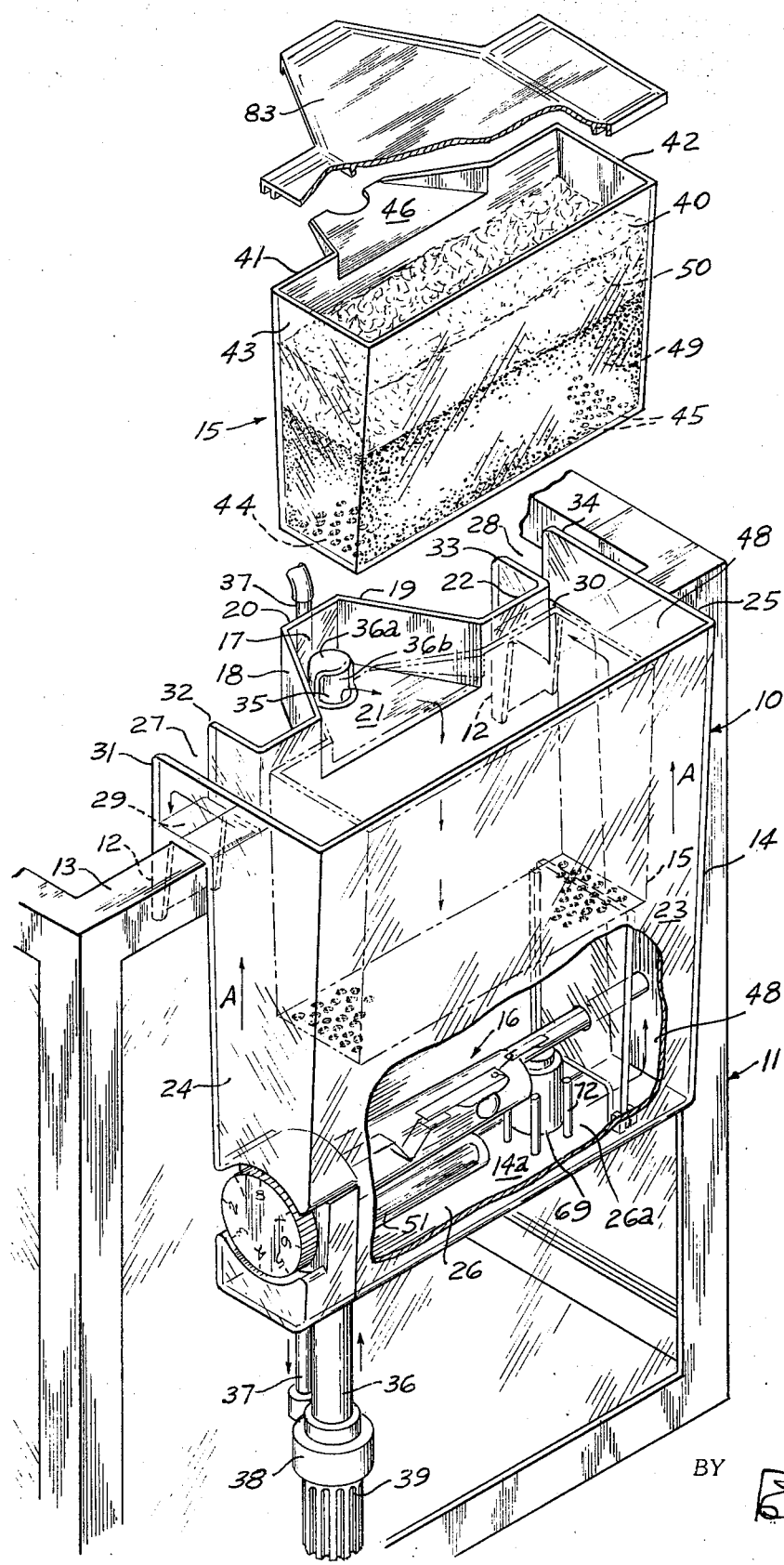
FIG. 1
INVENTOR.
WALTER SESHOLTZ
BY
Attorney May 12, 1970    W. SESHOLTZ    3,511,376
AQUARIUM FILTER AND HEATER
Filed Oct. 28, 1968    2 Sheets-Sheet 2

INVENTOR.
WALTER SESHOLTZ
BY
Attorney

United States Patent Office 3,511,376
Patented May 12, 1970

3,511,376
AQUARIUM FILTER AND HEATER
Walter Sesholtz, Park Ridge, N.J., assignor to Sternco Industries, Inc., Harrison, N.J., a corporation of New Jersey
Filed Oct. 28, 1968, Ser. No. 771,060
Int. Cl. E04h 3/20
U.S. Cl. 210—169        10 Claims

ABSTRACT OF THE DISCLOSURE

A home aquarium filter and heater device for positioning exteriorly of the aquarium. A casing, suspended from the rim of the aquarium on the outside thereof, contains in its upper portion a removable filter tank, the lower portion of the casing having an electric heating element connected to a thermostat float switch assembly. Water from the aquarium is pumped into the filter tank where it is purified, the water then flowing down directly into engagement with the heater and the float switch control components, and then upwardly through passageways formed by the filter tank and walls of the casing, over discharge spillways and back into the aquarium in filtered and heated condition. The filtered aquarium water that is to be heated performs the heat controlling operations itself by actuating a float member.

BACKGROUND OF THE INVENTION

Field of the invention

This invention relates to home aquarium filter and heater devices, and is particularly directed to an outside unitary filter and heater device preferably adapted for suspension from the rim of an aquarium.

The known art

There are various forms of outside filters adapted to receive aquarium water through the medium of pumping or syphoning means, so that the filtering action takes place outside of the aquarium tank. Such devices generally include an integral filtering component and special pump or filter pipe connections, so that when it becomes necessary to clean or replace the filtering component, the entire apparatus must be disconnected from the inlet and outlet piping connections—a tedious and time-consuming operation, and one that often requires special manipulative skill.

The heating of aquarium water is generally performed inside the aquarium, often by the use of an immersed insulated electric heating element. Where the aquarium water is not clean because it has not been filtered, or only partially filtered, the heating action is not of maximum effectiveness, first because of the heat absorbed by the prevalent debris, and second because such debris often covers the heating element with an insulating coating. Moreover, there is the danger of damage to the heating element in the event of an emptying of the aquarium through leakage or the accidental actuation of the heating element when the aquarium is empty, a danger which is not always obviated by conventional thermostat controls.

Objectives of the invention

It is the objective of this invention to provide effective, convenient and automatic means for filtering and heating aquarium water without the above-mentioned shortcomings. More specifically, among the objects of this invention are the provision of a combination filtering and heating device that can readily be mounted on an aquarium for receiving water therefrom to be filtered and heated outside of the aquarium; that includes a filter tank that can be removed for cleaning and filter replacement without separating the rest of the device from the aquarium or disconnecting any piping; that will operatively heat only filtered water free of debris; that includes heater switch means which can be automatically operated by the water in the filter tank, and which enables the water to open the heater circuit for instant shut-off when the volume of water is below a predetermined amount, thereby obviating the danger of damage to the heater components; that provides supplementary thermostat switch control means for controlling the water temperature; that provides heater means in proximate relation to the filter tank whereby the filtered water follows the shortest possible path before coming into engagement with said heater means; that provides outlet passageways for the filtered and heated water which passageways are integral with the device, thereby obviating the use of separate piping subject to heat losses; that provides easy access to the heat control means; and that provides a readily accessible thermostat control knob that is in non-interfering relation to the filter tank, whereby the latter can be freely removed and re-inserted.

Other objects, features and advantages will appear from the drawings and the description hereinafter given.

Summary of the invention

The preferred embodiment of this invention comprises a casing having therein a removable filter tank and directly therebelow a thermostat float switch and electric heater assembly, said casing being adapted for suspension from the rim of an aquarium and for positioning exteriorly thereof. The said casing has a centrally disposed intake chamber adapted to extend rearwardly over the top of the aquarium, there being an opening in the floor of said chamber for receiving the outlet portion of an aquarium water delivery pipe extending upwardly from the aquarium and connected to suitable pumping means. The filter tank fits into the top of said casing, the tank having an upper rear extension wall resting upon the floor of said intake chamber, the lateral walls of the tank being in slidable engagement with the walls of said casing. The said filter tank is so positioned as to leave laterally opposite discharge passageways in the casing communicating with spillways adapted to overlie the aquarium for the return of the operatively filtered and heated water. The filter tank is adapted to contain suitable filter material, the base of the filter being perforated to permit the downward passage therethrough of the filtered water.

The space below the filter tank constitutes a filtered water compartment containing the said thermostat float switch and electric heater assembly. In the embodiment illustrated, an encased electric heater element is electrically connected in series to a circuit containing a bimetallic thermostat switch member and a magnetic reed switch positioned for actuation by a magnetic element mounted on a float member floatable in the water within said filtered water compartment. The arrangement is such that only when said float member is above a predetermined elevation will said magnetic element close said reed switch. Thus, only when both the said thermostat switch and reed switch are closed will the said electric heating element be operatively actuated.

The said casing has at one side thereof a thermostat control knob, said knob being remote from the top of said casing so as not to interfere with the operative withdrawal and reinsertion of said filter tank.

Description of the drawings

FIG. 1 is an exploded perspective view of the aquarium filter and heater device of this invention shown mounted on the outside of an aquarium, a portion being broken away for clarity, the dot-dash lines showing the filter unit operatively in place.

Description of preferred embodiment

Figure 2:
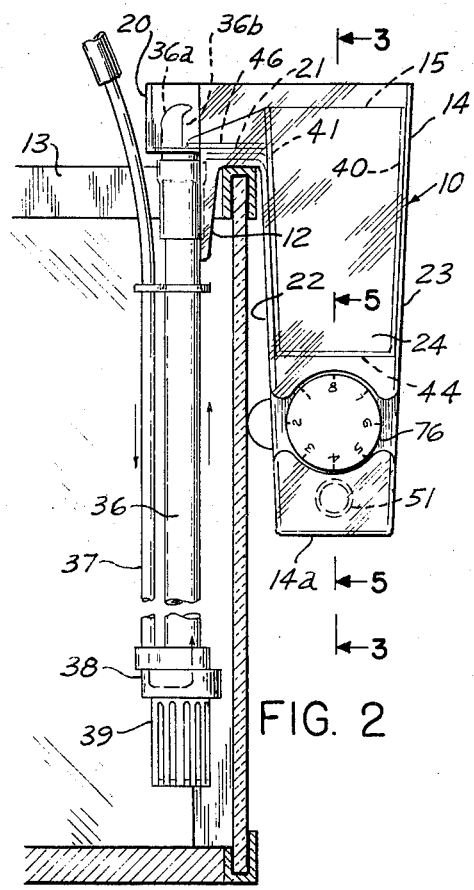
FIG. 2 is a side elevation of the filter and heater device of FIG. 1 shown mounted on the aquarium a fragmentary portion of which is shown in section, the removable filter unit being shown operatively in place.
Figure 3:
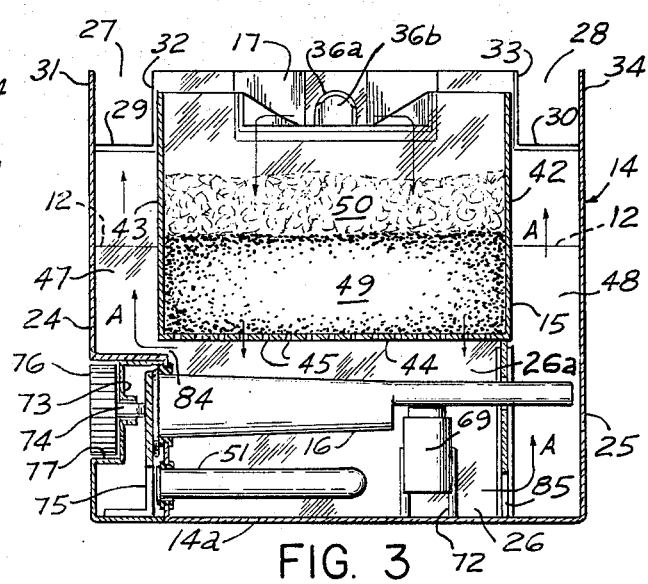
FIG. 3 is a section of FIG. 2 taken along line 3—3.
Figure 4:
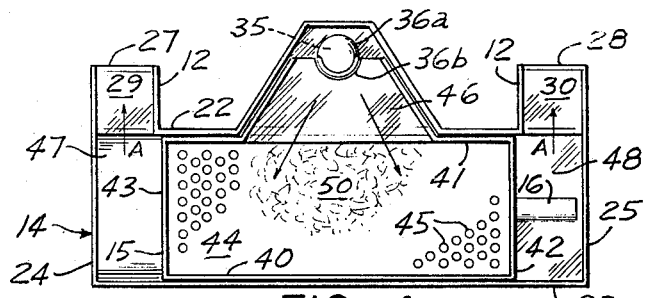
FIG. 4 is a top view of FIG. 3.

The filter and heater device 10 of this invention is illustrated as operatively positioned on the outside of the aquarium 11, the two rear laterally opposite hook portions 12 being mounted over the upper rim 13 of the aquarium. The said device 10 comprises the casing 14, the removable filter tank 15 at the upper portion thereof, and directly below said tank the thermostat float switch generally designated 16. Said casing 14, in the particular form thereof illustrated, contains the intake chamber 17 defined by the opposite lateral walls 18 and 19, the rear wall 20 and the floor 21, said chamber 17 extending rearwardly and positioned for overlying relation to the interior of the aquarium 11, said floor 21 extending forwardly from said rear wall 20 to the back wall 22 which, together with the front wall 23, side walls 24 and 25 and base 14a define the main interior chamber 26 of casing 14. Disposed over said hook portions 12 are the return discharge spillways 27 and 28 comprising the respective floors 29 and 30, and the respective pairs of walls 31, 32 and 33, 34, the arrangement being such that said spillways 27 and 28 are channel-shaped.

The said floor 21 of the said intake chamber 17 contains an opening 35 through which extends top portion 36a of the discharge pipe 36, said top portion having an open portion 36b constituting the discharge end of said pipe 36. The said discharge pipe 36 together with the air inlet pipe 37 and base fitting 38, which are immersed in the aquarium water, constitute a pumping apparatus for pumping water from said aquarium 11 into the exteriorly disposed filter and heater device 10, a detailed description of said pumping apparatus not being deemed necessary for an understanding of this invention since it is well understood by those versed in the art. Suffice it to say that air, pumped downwardly through pipe 37, is short-circuited in fitting 38 and upwardly through 36, effecting a sucking action at the grated water inlet 39 and drawing water up into said pipe 36 for discharge into the said device 10 constituting the present invention.

The said filter tank 15 comprises the respective front and rear walls 40 and 41, the opposite side walls 42 and 43, the floor 44 with perforations 45 therein and the upper rear extension wall 46 proportioned and positioned for overlying engagement with said floor 21 of said intake chamber 17. The tank 15 is so proportioned that when operatively in place, the said front wall 40 will be adjacent the front wall 23 of the casing 14, and the said side walls 42 and 43 will be spaced inwardly from the respective side walls 25 and 24 of said casing 14. The arrangement is such that said filter tank 15 will be maintained in its operatively suspended position within the said chamber 26 of the casing 14 by the engagement of walls 46, 40 and 41 of said filter tank with the respective walls 21, 23 and 22 of said casing 14—forming outlet passageways 47 and 48 communicating with said respective spillways 27 and 28. In operative use said filter tank 15 contains suitable filtering material, such as a bottom layer of charcoal 49 and a top layer of glass wool 50.

The said thermostat float switch 16 is positioned in compartment 26a directly below the perforated floor 44 of the filter tank 15 for two purposes, first so that filtered water flowing downwardly through said perforations 45 will directly operatively engage and actuate the coacting control elements of said switch, and second so that direct access can be had to said switch when the filter tank 15 is removed from the casing 14 for cleaning or filter replacement.

Positioned adjacent the base 14a of casing 14 is an electric heating component 51 which, in its preferred form, is a cartridge 52 containing a heating element of conventional construction disposed within the heat conducting tube 53 removably supported by the grommet 54 which is operatively secured in place by the securing means 55. Disposed thereabove is the casing 56 containing the contact components of the said thermostat float switch 16. Said components comprise the angular spring-loaded thermostat contact arm 57 one end being connected to the contact terminal 58, the other having the contact element 59 in coactive relation to the contact element 60 on the bimetallic arm 61 electrically connected to terminal mounting 62. Also electrically connected to said terminal mounting 62 is the contact arm 63 of the conventional magnetic reed switch 64, the contact element 65 of said contact arm 63 being normally maintained out of engagement with the yieldable coacting contact element 66 of the contact arm 67, the latter being electrically connected to terminal 68. Positioned underneath said magnetic reed switch 64 is the magnetic float member 69 having at the top thereof the magnetic element 70 and containing therebelow suitable light flotation material such as "styrofoam" (not shown). Said member 69 has an outer casing 71 which is slidably mounted within the guide member 72 supported on the base 14a of casing 14 and permitting floating movements of said member 69 along a vertical path. The said magnetic element 70 is so positioned and proportioned as to be in operative adjacent relation to the contact arms 63 and 67 of said magnetic reed switch 64 when the float member 69 is elevated at predetermined levels of water within the said interior chamber 26 of the casing 14, and is in non-operative relation to said contact arms at lower levels of said water. It is only when the float member 69 is at an upper operative position with respect to said contact arms 63 and 67 that their respective contact elements 65 and 66 will be brought into contact under the magnetic influence of said magnetic element 70, in a manner known to those skilled in the art.

Extending through the recessed wall portion 73 of side wall 24 of casing 14 is the adjusting screw shank 74 supported by and in threaded engagement with the inner wall 75, the outer end of said shank carrying the suitably calibrated thermostat control knob 76 disposed within the well 77 and adapted for manual rotary manipulation. The inner terminal 78 of said screw shank 74 is in abutting engagement with said thermostat contact arm 57, the position of the contact element 59 thereof with respect to the coacting contact element 60 being dependent upon the selected position of the knob 76.

Figure 5:
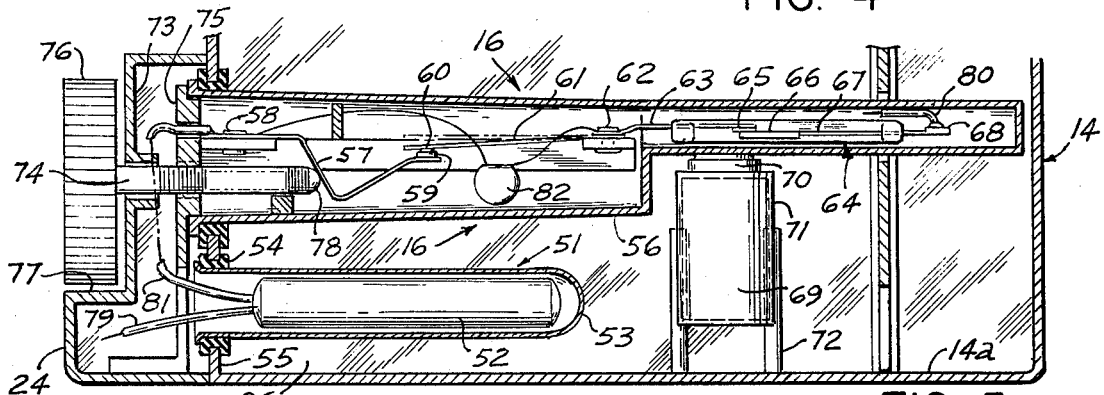
FIG. 5 is an enlarged fragmentary section of FIG. 2 taken along line 5—5 showing the thermostat float switch in closed condition, the dot-dash lines showing the thermostat contact arms in open non-contacting positions.
Figure 6:
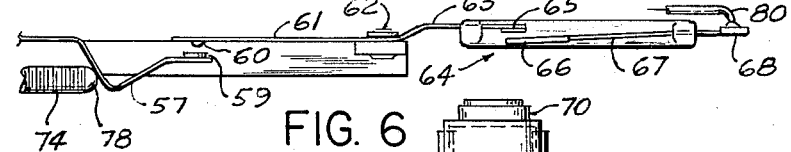
FIG. 6 is a fragmentary view of the switch of FIG. 5 when in open condition.

It is not deemed necessary to give a detailed description of said thermostat switch construction, since it is well known to those skilled in the art. Suffice it to say, for the purpose of this specification, that at a predetermined temperature, the bimetallic contact arm 61 will be operatively bent a sufficient amount to bring its contact element 60 into engagement with the coactive contact element 59 to close the circuit, if the said magnetic switch elements 65 and 66 are also in contact, such contact being effected, as aforesaid, when the magnetic element 70 is at an upper operative level. Referring to FIGS. 5 and 6, conductors 79 and 80 are connected to a suitable wall outlet (not shown), conductor 81 extending from the heating element 52 to terminal 58. The drawing also shows a capacitor 82 connected to the terminals 58 and 62, said capacitor being in parallel to the circuit through the thermostat contact arms 57 and 61.

In the embodiment illustrated, the casing 14 is provided with the removable cover member 83, shaped to fit over the entire unit, thereby to keep the interior of the casing clean so that uncontaminated filtered and heated water will be returned to the aquarium, as will more clearly hereinafter appear.

When the heater and filter device 10 is operatively connected to an aquarium and there is sufficient water in casing 14 to elevate the magnetic float 69 to its said operative position, the magnetic reed switch 64 will be closed and the circuit through the heater element 52 will be closed—provided the thermostats contacts 59 and 60 are operatively engaged. The water will then be heated under thermostatic control. Should there be insufficient or no water in the casing 14, the magnetic float will be at an inoperative low level, thereby opening the circuit through the heater 51 and thus preventing damage to the heater. This controlled heating operation also takes place when the filter tank 15 has been removed for cleaning or refilling purposes.

In the operative use of this device, water from the aquarium flows from aperture 36b of pipe 36 on to the extension floor 46 of the filter tank 15, down through the filter material 50 and 49 and out through the perforated floor 44 directly to engage the components of the thermostat float switch 16—the purified water being immediately heated without coursing through unduly long passageways. The clean heated water then flows through openings below the filter tank, such as openings at 84 and 85, up through said passageways 47 and 48 in the direction of arrows A, rearwardly along outlet channels 27 and 28, and back into the aquarium 11.

It is noteworthy that this device enables the aquarium water which is to be heated to perform the heat-controlling operations itself. The aquarium water within the casing 14 will—once the thermostat temperature has been operatively set—determine when the water heater is to be turned on or off by the amount of water within the device. Thermostat adjustments can be readily made without interfering with the operation of the filter tank 15, since the control knob is conveniently located at an accessible side wall in non-interfering relation to the filter.

It should be further noted that the filter tank 15 can be removed for cleaning or filter material replacement simply by slidably lifting it upwardly since no portion of said tank is interlocked or attached either to the casing 14 or the air and water pipes 37 and 36. The removal or replacement of said tank does not require the detachment of casing 14, nor the discontinuance of the operation of the control switch 16.

In the above description, the invention has been disclosed merely by way of example and in preferred manner; but obviously many variations and modifications may be made therein.

I claim:

1. An aquarium filter and heater device comprising a casing, a filter tank removably supported in said casing at the upper portion thereof and defining a compartment in said casing therebelow, water heating means in said compartment of the casing below the filter tank, said filter tank having outlet aperture means at the bottom thereof for the passage of filtered water therethrough to the water heating means whereby the filtered water will come into operative engagement with the heating means, said casing including support means of said upper portion for suspending the casing from the wall of an aquarium, and water inlet means for admission of water from the aquarium to said filter tank, said filter tank having side walls at least one of which is spaced from said casing to define a lateral passageway leading from said compartment to the upper portion of said casing for the flow of heated, filtered water from the water heating means, said support means having a channel for the outflow of water from said lateral passageway to the aquarium.

2. An aquarium filter and heater device according to claim 1, said water inlet means comprising an inlet chamber having an outwardly extending floor proportioned for overlying relation to said aquarium, said filter tank having an upper extension wall in overlying engagement with said floor of said inlet chamber.

3. An aquarium filter and heater device according to claim 1, said inlet chamber being disposed on the rear wall of said casing intermediate said sidewalls.

4. An aquarium filter and heater device according to claim 3, said casing comprising a rearwardly extending wall at said channels constituting a spillway for receiving and discharging filtered and heated water from said passageways.

5. An aquarium filter and heater device according to claim 2, said inlet chamber floor extending rearwardly from the casing and having an apertured portion therein, the said water inlet means having a water delivery conduit extending upwardly through said apertured portion, whereby water opeartively delivered by said conduit will flow over said extension wall of the filter tank and downwardly into the interior of the tank.

6. An aquarium filter and heater device according to claim 4, said support means comprising a hook portion on said rearwardly extending spillway wall on the underside thereof for operative mounting over the rim of said aquarium.

7. An aquarium filter and heater device according to claim 1, said heating means having an electric heating element, a magnetic reed switch in series with said heating element, and a float member positioned within said casing and adapted to be floatably supported by water operatively within the casing, said float member carrying a magnetic element adapted for operative coaction with said magnetic reed switch, said magnetic element being in operative relation to said reed switch to close it when said float member is operatively positioned at predetermined levels of water within the casing, and being in non-operative relation to the reed switch at lower levels of said water.

8. An aquarium filter and heater device according to claim 7, said casing having vertically extending guide means in slidable engagement with said float member, whereby the float member is operatively movable along a vertical path.

9. An aquarium filter and heater device according to claim 7, said heating means having a thermostat switch in series with said electric heating element and said reed switch, said heating element, reed switch and thermostat switch being disposed in said compartment.

10. An aquarium filter and heater device according to claim 9, said thermostat switch having an operatively connected control knob, said knob being disposed exteriorly of said casing and adjacent a lateral side thereof.

References Cited

UNITED STATES PATENTS

| 2,652,151 | 9/1953 | Legus. | |
|---|---|---|---|
| 3,303,819 | 2/1967 | Wade | 119—5 |
| 3,279,430 | 10/1966 | Mugridge | 119—5 X |
| 3,324,829 | 6/1967 | De José et al. | 119—5 |
| 3,392,836 | 7/1968 | Willinger | 210—169 |

REUBEN FRIEDMAN, Primary Examiner

T. A. GRANGER, Assistant Examiner

U.S. Cl. X.R.

119—5